United States Patent
Kane

(10) Patent No.: US 9,347,759 B2
(45) Date of Patent: May 24, 2016

(54) METHOD TO FIXTURE AND INSPECTION CONTOURED AERODYNAMIC SURFACES

(71) Applicant: The Boeing Company, Chicago, IL (US)

(72) Inventor: Daniel J. Kane, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 282 days.

(21) Appl. No.: 13/943,972

(22) Filed: Jul. 17, 2013

(65) Prior Publication Data

US 2015/0020396 A1    Jan. 22, 2015

(51) Int. Cl.
*G01B 5/00*  (2006.01)
*B64F 5/00*  (2006.01)
*G01M 5/00*  (2006.01)

(52) U.S. Cl.
CPC ... *G01B 5/00* (2013.01); *B64F 5/00* (2013.01); *B64F 5/0045* (2013.01); *G01M 5/005* (2013.01); *G01M 5/0091* (2013.01)

(58) Field of Classification Search
CPC .............. G01B 5/00; G01B 5/20; G01B 5/28; G01B 5/285; G01B 5/205; B65F 5/0045
USPC ........ 33/561.1, 501, 549, 573, 530, 562, 565, 33/567, 551, 553
See application file for complete search history.

(56) References Cited

U.S. PATENT DOCUMENTS

| | | | |
|---|---|---|---|
| 2,394,489 A * | 2/1946 | Rowe | 33/557 |
| 4,146,967 A * | 4/1979 | Rohner et al. | 33/530 |
| 4,914,828 A * | 4/1990 | Fiedor et al. | 33/554 |
| 4,956,764 A * | 9/1990 | Carver et al. | 700/59 |
| 5,000,037 A * | 3/1991 | Baresh | 73/104 |
| 5,285,397 A * | 2/1994 | Heier et al. | 702/167 |
| 5,481,811 A * | 1/1996 | Smith | 33/573 |
| 5,588,216 A * | 12/1996 | Rank et al. | 33/286 |
| 6,460,264 B1 * | 10/2002 | Bos et al. | 33/549 |
| 7,103,985 B1 | 9/2006 | Phillips et al. | |
| 8,176,792 B2 * | 5/2012 | Kozasa et al. | 73/840 |
| 2004/0068884 A1 * | 4/2004 | Jones et al. | 33/645 |
| 2009/0301235 A1 * | 12/2009 | Kozasa et al. | 73/865.8 |
| 2012/0163673 A1 | 6/2012 | Thompson et al. | |

OTHER PUBLICATIONS

European Search Report for Application No. 14173498.8 dated Jan. 26, 2015, 5 pgs.

* cited by examiner

*Primary Examiner* — Christopher Fulton
(74) *Attorney, Agent, or Firm* — Patterson + Sheridan, LLP

(57) ABSTRACT

A method to fixture and inspect contoured aerodynamic surfaces of a part, such as an engine inlet lip skin, is provided. A controlled preload is applied to one or more discrete locations along the contoured surface to constrain the lip skin at the locations the lip skin would be constrained upon assembly on the airplane. The contoured surfaces are then inspected to dimensional requirements. The controlled preload can be applied by use of magnets or elastic bumpers.

18 Claims, 7 Drawing Sheets

FIG. 6A

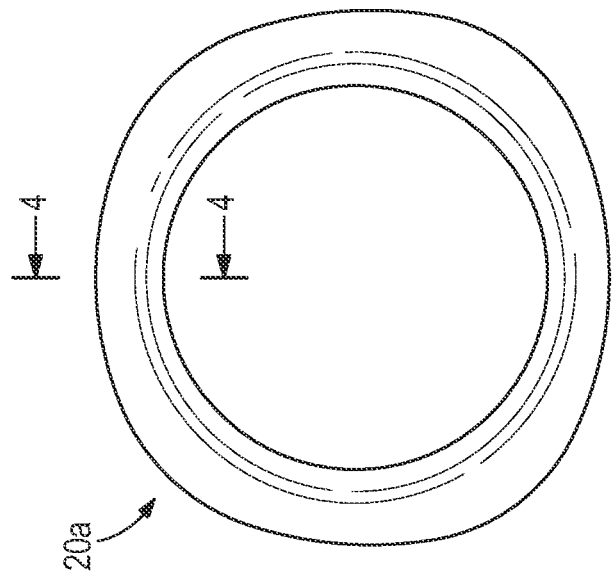
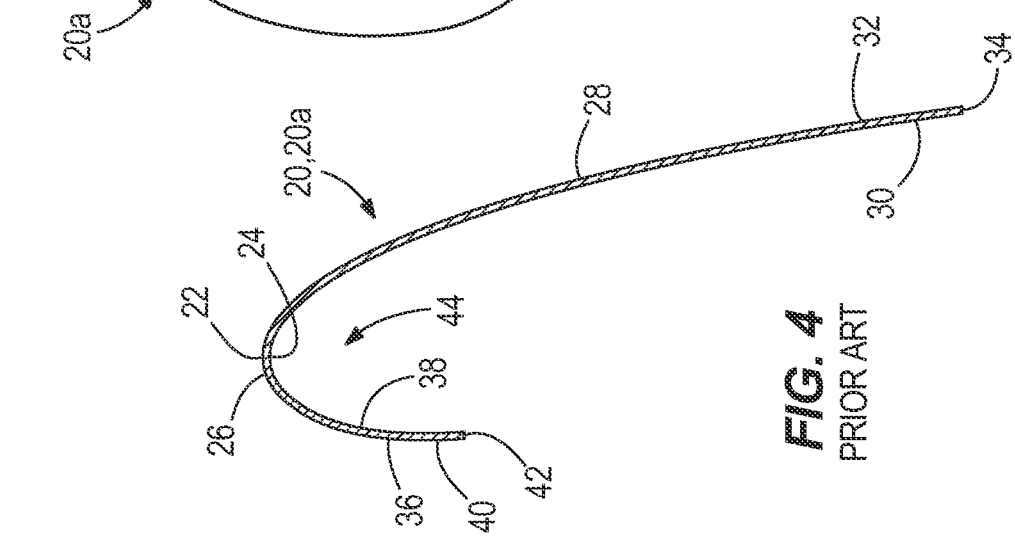
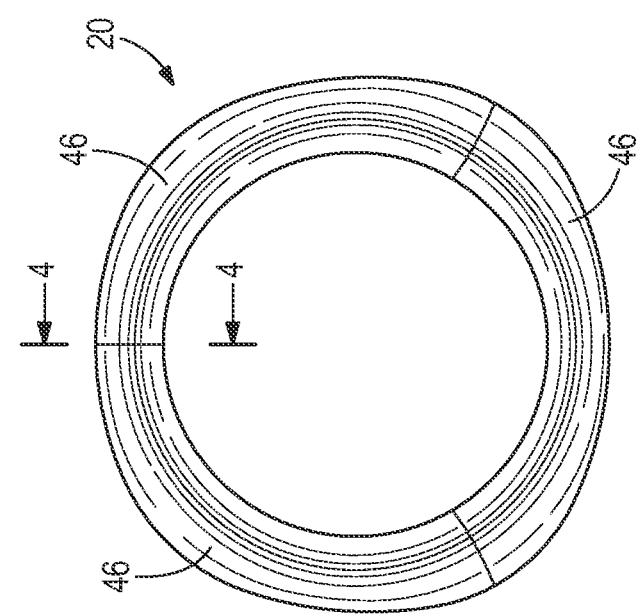

METHOD TO FIXTURE AND INSPECTION CONTOURED AERODYNAMIC SURFACES

BACKGROUND

Most aerodynamic surfaces, such as airplane leadings edges, are thin metallic structures that lack rigidity. The parts lack rigidity due to the thickness of the sheet material leading to low rigidity in bending and torsion, particularly for long parts such as engine inlet lip skins and wing leading edges. The lack of rigidity makes the parts very difficult to inspect to the dimensional requirements. Leading edges on the next generation of aircraft are being manufactured to tighter tolerances as a method to reduce drag and fuel burn. To ensure these tighter tolerances are met, advances are required in the methods to verify the tolerances of both the part and assembly.

One type of an airplane leading edge is an engine inlet lip skin. A typical lip skin is illustrated in FIGS. 1-4. Multi-piece lip skins 20 and single piece lip skins 20a are known in the art. The lip skin 20, 20a is formed into a thin, aerodynamically shaped metal skin which is generally circular when viewed in plan view as shown in FIGS. 2 and 3. The lip skin 20, 20a is usually formed of aluminum, but may be formed of other impact resistant materials, such as titanium. The lip skin 20, 20a includes a curved leading nose 22 having an internal face 24 and an external face 26, an outer trailing surface 28 having an internal face 30 and an external face 32, the outer trailing surface 28 extending from the nose 22 and terminating in an edge 34, and an inner trailing surface 36 having an internal face 38 and an external face 40, the inner trailing surface 36 extending from the nose 22 and terminating in an edge 42. As a result of the structure, a pocket 44 is formed by the nose 22, the outer trailing surface 28 and the inner trailing surface 36. The lip skin 20, 20a is formed to be smooth and devoid of irregularities and discontinuities to reduce drag and to avoid the creation of turbulence. The nose 22 provides a smooth transition between the outer and inner trailing surfaces 28, 36, while creating a small frontal area to reduce drag. The outer trailing surface 28 is longer than the inner trailing surface 36. The multi-piece lip skin 20 is formed of a plurality of sectors 46 which are affixed together by known means to form the completed lip skin 20. The multi-piece lip skin 20 is flexible and if the lip skin 20 were placed on a flat surface, the lip skin 20 would not hold its shape due to the thinness of the metal. The single-piece lip skin 20a is more rigid than the multi-piece lip skin 20, however, it also cannot be placed on a flat surface and hold its shape due to the thinness of the metal.

Lip skins have complex shapes that are often out-of round and difficult to manufacture. Lip skins are typically produced by multiple-stage deep draw operations, bulge forming, or spin forming, requiring complex and costly tooling and time consuming multi-step processing. As a result, it can be difficult to meet the tolerance requirements.

A method is provided herein which allows a part, such as a lip skin, to constrain the lip skin at the locations the lip skin would be constrained upon assembly on the airplane and inspected to dimensional requirements by a measurement system. Other features and advantages will become apparent upon a reading of the attached specification, in combination with a study of the drawings.

SUMMARY

A method to fixture and inspect contoured aerodynamic surfaces of a part, such as a lip skin, is provided. A controlled preload is applied to one or more discrete locations along the contoured surface to constrain the lip skin at the locations the lip skin would be constrained upon assembly on an airplane. The contoured surfaces are then inspected to dimensional requirements. The controlled preload can be applied by use of magnets or elastic bumpers.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 2 shows a plan view of the multi-piece lip skin shown in FIG. 1;

FIG. 3 is a plan view of a single piece lip skin;

FIG. 4 is a cross-sectional view along lines 4-4 of FIGS. 2 and 3;

DETAILED DESCRIPTION

Figure 1:
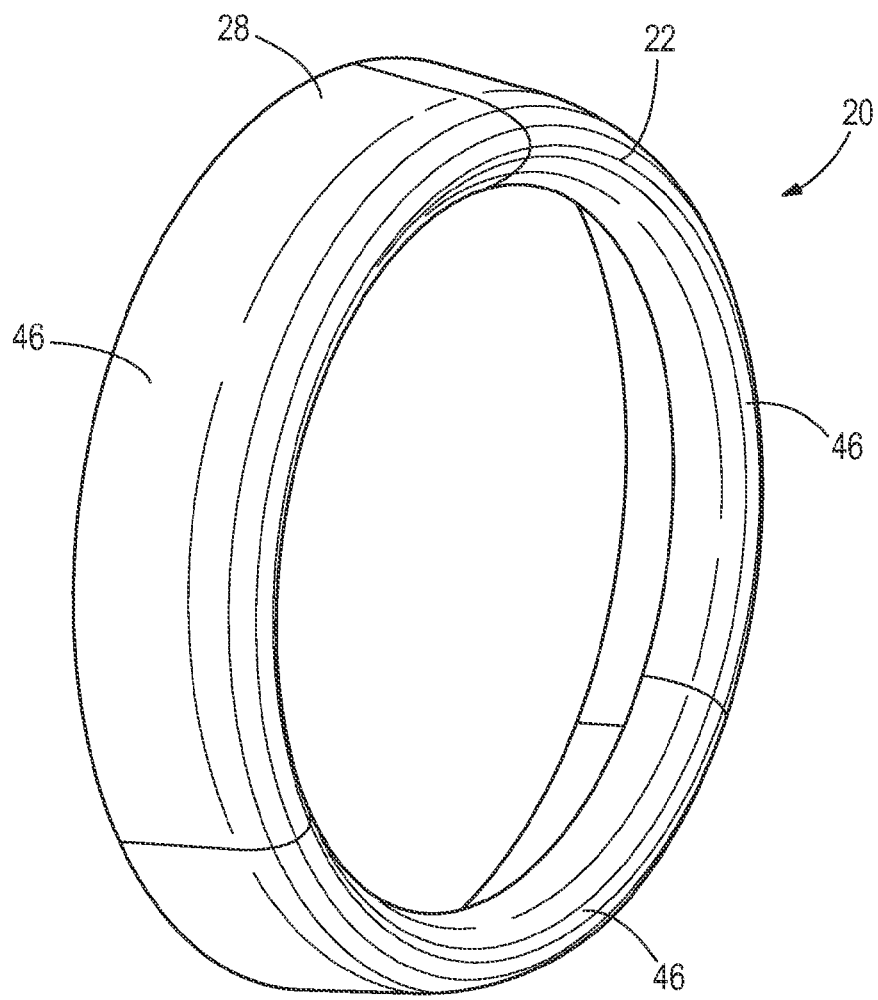
FIG. 1 shows a perspective view of a multi-piece lip skin.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

An inspection method is provided which allows a relatively flexible contoured part, such as an airplane lip skin 20, 20a, to be constrained at the locations the lip skin 20, 20a would be constrained upon assembly on the airplane and inspected to dimensional requirements. The inspection of the lip skin 20, 20a, while constrained as would be on the airplane, allows for precise measurement of the lip skin 20, 20a and adjustment of the manufacturing process for the contoured part (tooling modifications). This enables the finished part to meet much tighter tolerances and verify that those tolerances are met, at both the part and assembly level.

Figures 6, 6A:
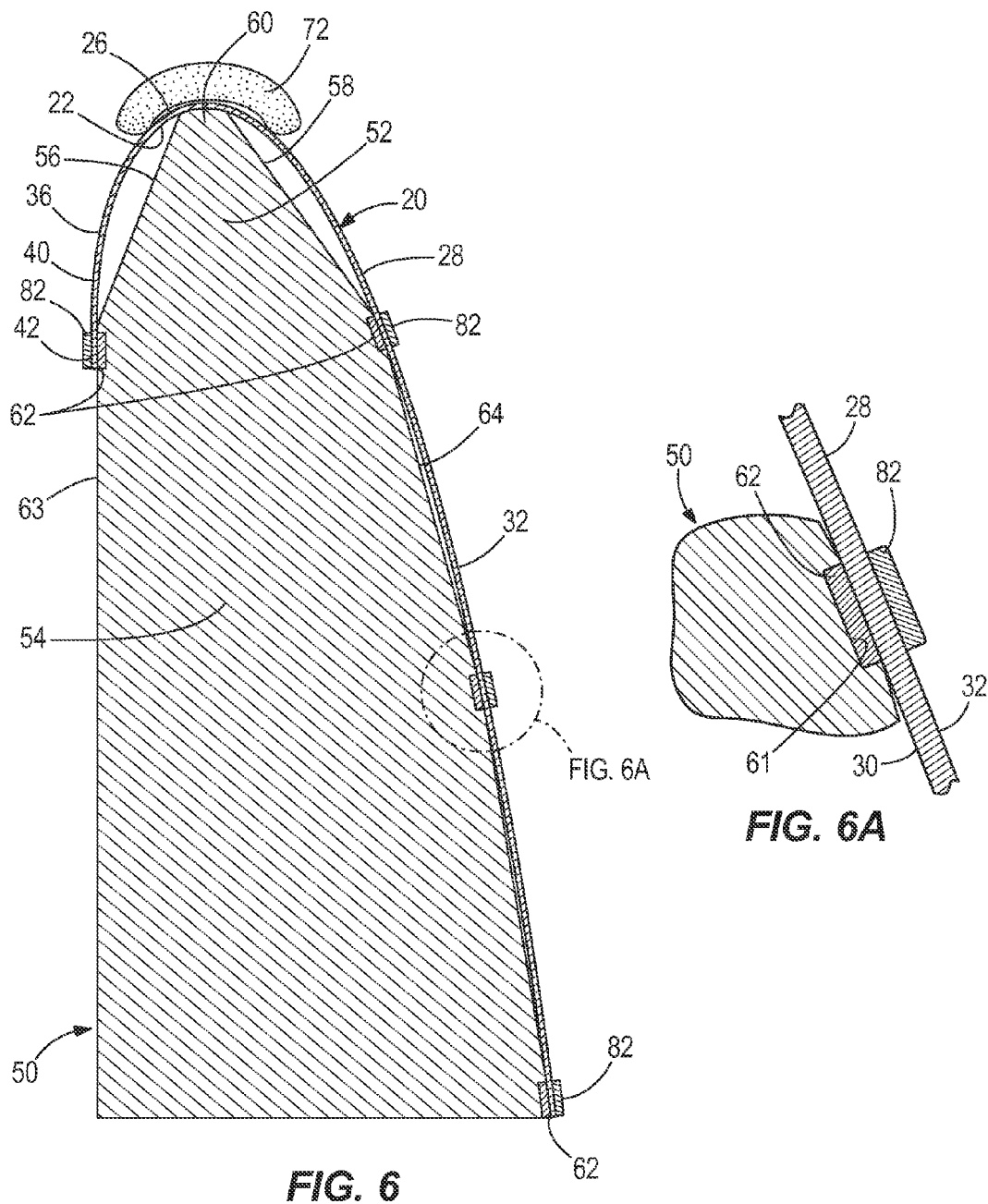
FIG. 6 is a cross-sectional view of the multi-piece lip skin mounted on a fixture in accordance with a first embodiment of the present invention.
FIG. 6A is an enlarged view of a portion of FIG. 6.
Figure 7:
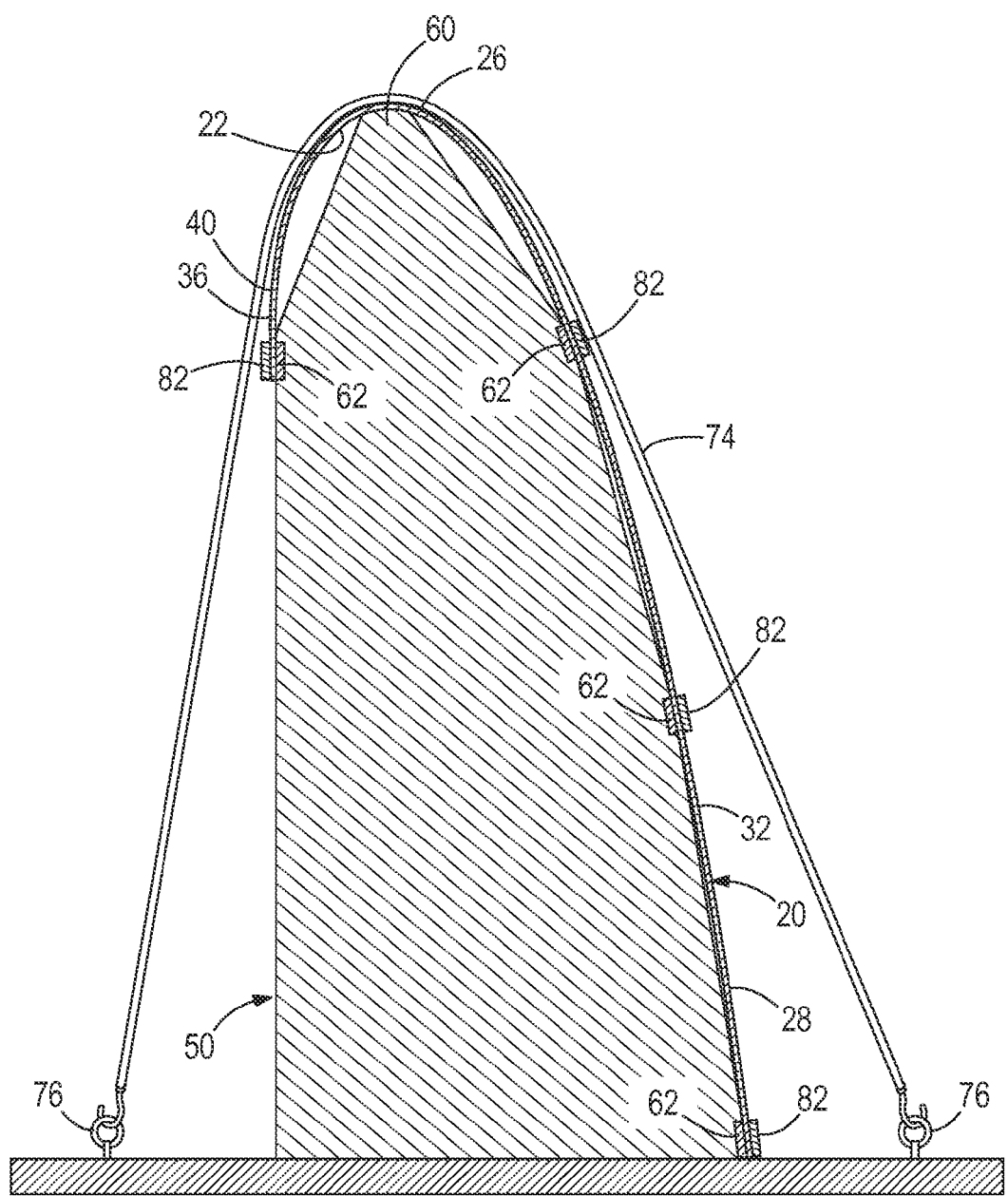
FIGS. 7 and 8 are cross-sectional views of the multi-piece lip skin mounted on a fixture in accordance with alternate embodiments of the present invention.
Figure 8:
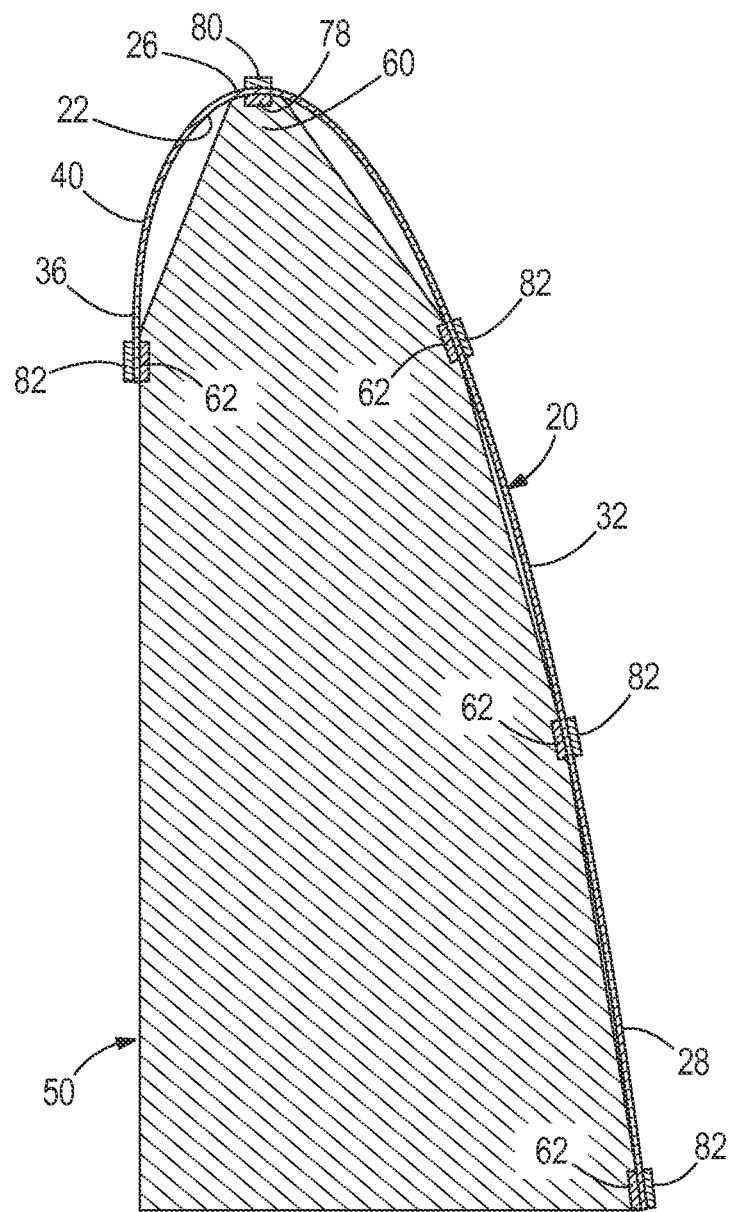
Figures 9, 9A:
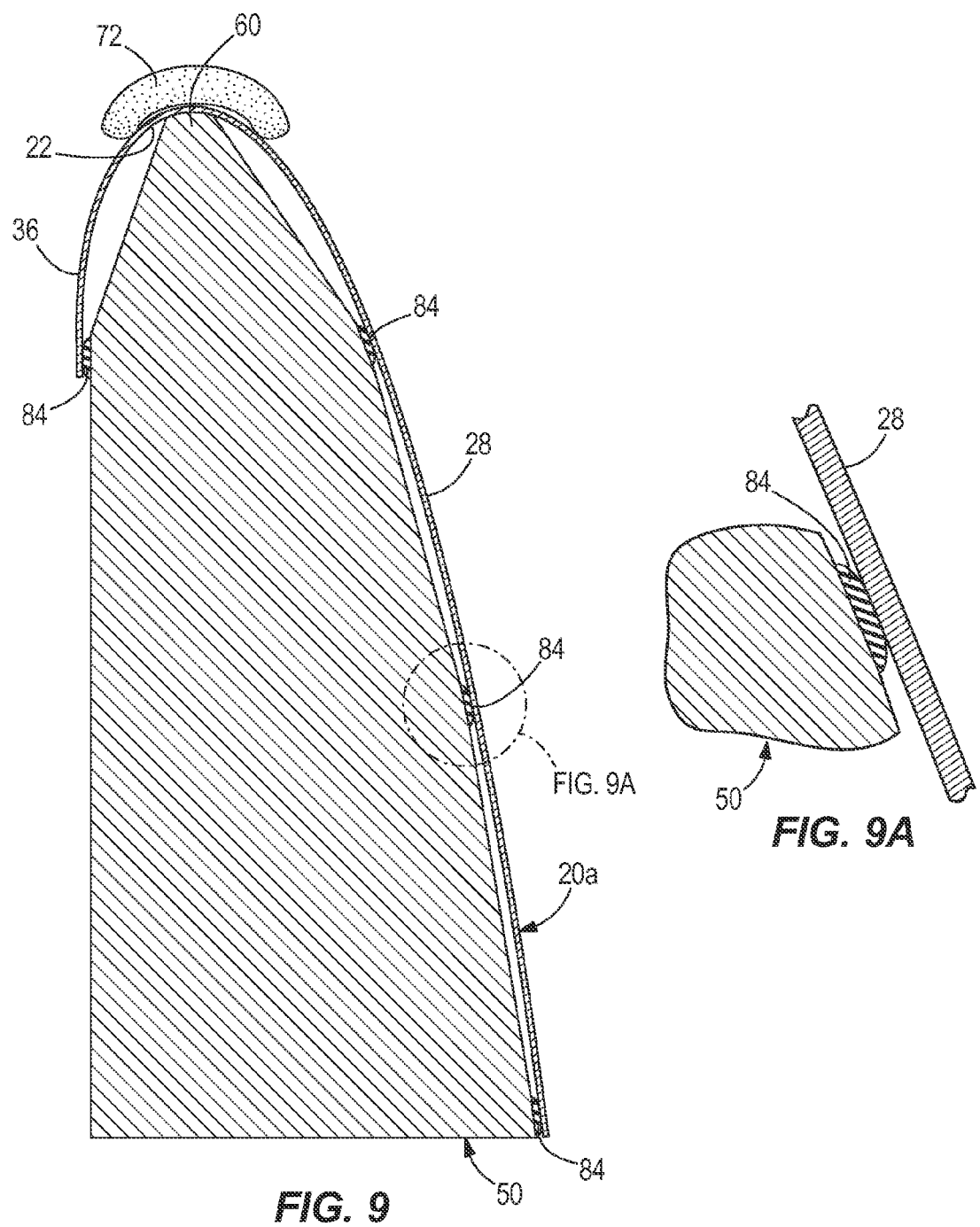
FIG. 9 is a cross-sectional view of the lip skin mounted on a fixture in accordance with a second embodiment of the present invention.
FIG. 9A is an enlarged view of a portion of FIG. 9.

A first embodiment of the inspection method, shown in FIGS. 6-8, is disclosed for inspecting a multi-piece part, such as a multi-piece lip skin 20 of an aircraft. A second embodiment of the inspection method, shown in FIGS. 9 and 9A, is disclosed for inspecting a single piece part, such as a single piece lip skin 20a of an aircraft. The inspection method can be used to inspect other types of parts, for example, but not limited to, leading edges of wings, nacelles, aircraft noses, vertical fins of aircraft, horizontal stabilizers of aircraft, etc. For ease in description and illustration, the present method is described with regard to the aircraft lip skins 20, 20a shown in FIGS. 1-4.

The present inspection method provides a fixture 50 upon which the lip skin 20, 20a can be placed to inspect the lip skin 20, 20a. The fixture 50 is preferably made of aluminum, but can also be made of non-ferrous materials. The fixture 50 generally mirrors the shape of the lip skin 20, 20a in its nominal or final shape (the shape of the lip skin 20, 20a assumes when assembled for use on the aircraft and the lip skin 20, 20a is attached to its internal structure). That is, the fixture 50 has a shape which generally conforms or corresponds to the contoured surface(s) of the lip skin 20, 20a or other part having one or more flexible contoured surfaces. The fixture 50 has an upper section 52 and a lower section 54. The upper section 52 has a pair of side surfaces 56, 58 which taper inwardly and an upper support surface 60 which mirrors the shape of the nose 22 of the lip skin 20. The support surface 60 is smaller than the nose 22. The lower section 54 has a pair of side surfaces 63, 64 which generally taper inwardly from their bottom edges to the associated side surface 56, 58 of the upper section 52. The side surfaces 56, 58 of the lower section 54 are formed such that when the lip skin 20 is seated or placed on and secured to the fixture 50 as described herein, the lip skin 20 takes it nominal shape.

Figure 5:
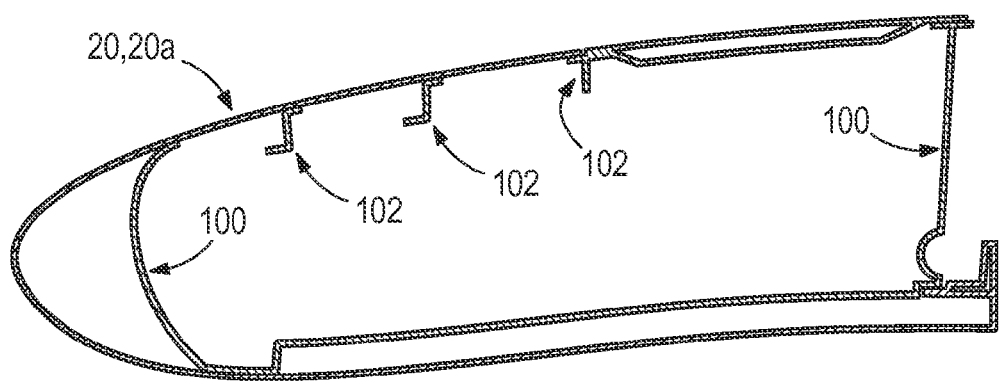
FIG. 5 is a schematic view of a lip skin showing the internal structure.

In the first embodiment of the method, the fixture 50 includes a plurality of magnets 62, which may be rare-earth magnets, mounted at predetermined discrete locations on the fixture 50. These predetermined discrete locations correspond to the positions where the bulkhead 100 and stiffeners 102 (see FIG. 5) will be attached to the lip skin 20 when formed as a component of the aircraft. In this regard, the discrete locations correspond to intended points of attachment between the lip skin 20 and the final component, assembly, structure, product, etc. Each magnet 62 can be mounted on the fixture 50 in a variety of ways, such as by adhesive, mounted in an associated pocket 61 by adhesive or press-fit, by a screw through the magnet 62 and attached to the fixture 50, etc. The magnets 62 may be seated just below the side surfaces 63, 64 of the fixture 50, or can be flush mounted with the side surfaces 63, 64 of the fixture 50. The magnets 62 are approximately half of an inch in diameter, and have a low profile, allowing line of sight access to the majority of the surface for inspection. The magnets 62 may be spaced apart from each other at predetermined distances.

The lip skin 20 is seated on the fixture 50 by sliding the lip skin 20 over upper section 52 of the fixture 50 until the internal face 24 of the nose 22 is proximate to the support surface 60 of the fixture 50, the inner trailing surface 36 seats over the side surface 56 of the upper section 52 of the fixture 50, with its edge 42 overlapping the upper end of the side surface 63 of the lower section 54, and the outer trailing surface 28 seats over the side surface 58 of the upper section 52 and seats over the side surface 64 of the lower section 54. As a result, the upper section 52 of the fixture 50 seats within the pocket 44 of the lip skin 20. An index pin (not shown) or other means for locating the lip skin 20 on the fixture 50 may be provided.

After the lip skin 20 is seated on the fixture 50, the nose 22 of the lip skin 20 is moved into engagement with the support surface 60 of the fixture 50 in order to properly support the lip skin 20 on the fixture 50. This can be accomplished by providing a force on the nose 22, for example by placing sandbags 72 on the external surface 26 of the nose 22 as shown in FIG. 6, or by using bungee cords 74 attached to external hold-downs 76 to press on the external surface 26 of the nose 22 of the lip skin 20 as shown in FIG. 7. Although generally shown in the figures as a downward force, depending upon the orientation of the fixture 50 and lip skin 20, the force applied may be in any direction so long as the nose 22 is moved toward engagement with the fixture 50. Similarly, a magnet 78, which may be a rare-earth magnet, may be mounted in the support surface 60 of the fixture 50 and a magnet 80, which may be a rare-earth magnet, may be positioned on the external face 26 of the nose 22 of the lip skin 20 as shown in FIG. 8 to position the nose 22 of the lip skin 20 between the magnet 78 and the magnet 80 to provide the force.

Once the nose 22 of the lip skin 20 is fully engaged with the support surface 60 of the fixture 50, magnets 82, which may be rare-earth magnets, are applied to the external faces 32, 40 of the lip skin 20 and align with the correspondingly positioned magnets 62 mounted on the fixture 50, such that the correspondingly positioned 62, 82 interact with each other, and the leading and trailing surfaces 28, 36 are positioned between the respective magnets 62, 82. The interaction between the correspondingly positioned magnets 62, 82 applies a preload that pulls the lip skin 20 inwardly toward the fixture 50. The placement of the magnets 62, 82 simulates the positions where the bulkhead 100 and stiffeners 102 (see FIG. 5) will be attached to the lip skin 20 when formed as a component of the aircraft. The application of magnets 62, 82 holds the lip skin 20 vertically in the nominal position on the fixture 50. The magnets 82 are applied to the lip skin 20 starting in the middle circumferentially at the bulkhead 100, and then at stiffener locations 102, and then moving outward circumferentially. This pulls the lip skin 20 with a controlled preload at the aircraft fastening locations. The magnets 62, 82 allow for precise control of the preload within stress limits. The lip skin 20 is pulled into the fixture 50 at all locations with no gapping.

After the magnets 82 are applied to the external faces of the lip skin 20, the force (provided by the sandbag 72, bungee cords 74 attached to external hold-downs 76, or magnet 80) is removed from the nose 22.

The magnets 62, 82 (and magnets 78, 80 if used) are preferably rubber or plastic coated in order to avoid damage to the surfaces of the lip skin 20. The magnets 62, 82 are preferably evenly-spaced circumferentially at intervals several inches apart around the fixture 50, with a force not to excess the allowable preload stress accounting for the distance the magnets 62, 82 are separated.

Figure 10:
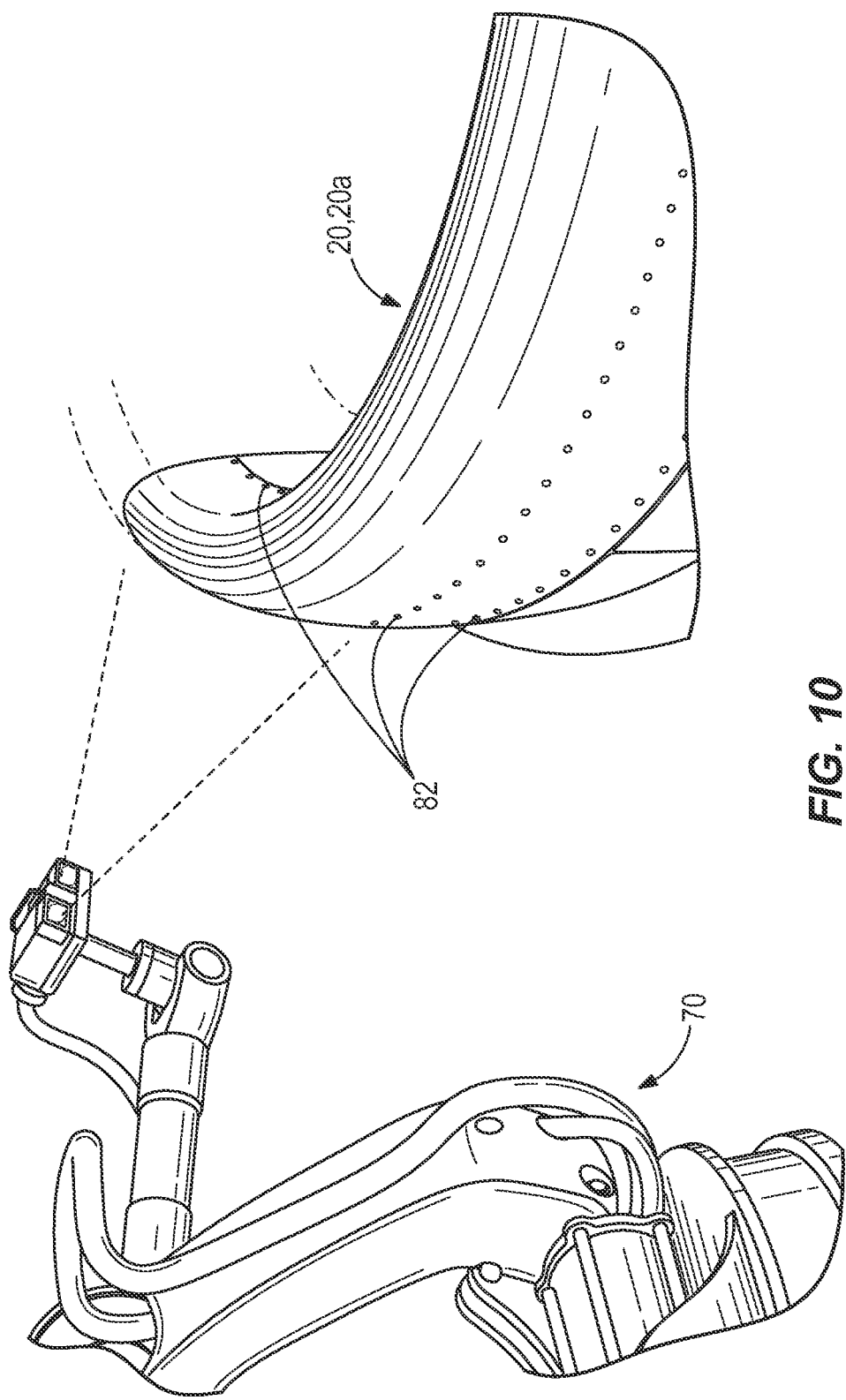
FIG. 10 is perspective view of the lip skin mounted on the fixture and shown being inspected by a measurement system.

Thereafter, the lip skin 20 is inspected and analyzed relative to the dimensional requirements by a measurement system 70 (FIG. 10). The use of the fixture 50 and the magnets 62, 82 in this first embodiment of the method allows visual access to the external faces of the lip skin 20 and minimizes shadowing. Since the magnets 82 are relatively small, shadowing is minimized. The magnets 62, 82 allow for precise control of a preload within stress limits and allows free access to the external faces for inspecting in all areas. The inspection of the lip skin 20 while constrained as would be on the airplane, allows for precise measurement of the lip skin 20 and adjustment of the manufacturing process for the contoured part (tooling modifications).

The measurement system 70 can be performed by a variety of devices, such as photogrammetry (ATOS (Advanced Topometric Sensor)) as shown in FIG. 11, CMM (Coordinate Measuring Machine), laser radar, Arm Tracker CMM/Laser System, etc.

In the second embodiment of the method as shown in FIGS. 9 and 9A, the fixture 50 includes elastic bumpers 84, each of which may be formed by a plurality of spaced apart bumpers or a circumferentially continuous bumper, mounted at predetermined discrete locations. The predetermined discrete locations correspond to the positions where the bulkhead 100 and stiffeners 102 (see FIG. 5) will be located in the lip skin 20*a* when formed as part of the aircraft. Each elastic bumper 84 can be mounted on the fixture 50 in a variety of ways, such as by adhesive on the surface of the fixture 50.

The lip skin 20*a* is seated on the fixture 50 by sliding the lip skin 20*a* over upper section 52 of the fixture 50 until the internal face 24 of the nose 22 is proximate to the support surface 60 of the fixture 50, the inner trailing surface 36 seats over the side surface 56 of the upper section 52 of the fixture 50, with its edge 42 overlapping the upper end of the side surface 63 of the lower section 54, and the outer trailing surface 28 seats over the side surface 58 of the upper section 52 and seats over the side surface 64 of the lower section 54. As a result, the upper section 52 of the fixture 50 seats within the pocket 44 of the lip skin 20*a*. An index pin (not shown) or other means for locating the lip skin 20*a* on the fixture 50 may be provided. When the lip skin 20*a* contacts the elastic bumpers 84, the lip skin 20*a* is pushed outwardly at those locations tightening the skin circumferentially with a controlled stress. This is suitable for use with a single piece lip skin 20*a* as it is more rigid than the multi-piece lip skin 20. If the single piece lip skin 20*a* was pulled inwardly by the magnets used in the first embodiment of the method, undesirable bulges may occur.

After the lip skin 20*a* is seated on the fixture 50, the nose 22 of the lip skin 20*a* is moved into engagement with the support surface 60 of the fixture 50 in order to properly support the lip skin 20*a* on the fixture 50. This can be accomplished by providing a force on the nose 22, for example by placing sandbags 72 on the nose 22 as shown in FIG. 9, or by using bungee cords 74 attached to external hold-downs 76 to press on the nose 22 of the lip skin 20*a* (like that shown in FIG. 7), or by using a magnet 78, which may be a rare-earth magnet, mounted in the support surface 60 of the fixture 50 and applying a magnet 80, which may be a rare-earth magnet, to the external face 26 of the nose 22 of the lip skin 20*a* (like that shown in FIG. 8).

Once the nose 22 of the lip skin 20*a* is fully engaged with the support surface 60 of the fixture 50, the bumpers 84 continue to push the lip skin 20*a* which is in contact therewith outwardly. The bumpers 84 push the lip skin 20*a* into the nominal position circumferentially around the fixture 50 by pushing the lip skin 20*a* tight circumferentially. This pushes the lip skin 20*a* with controlled preload at the aircraft fastening locations. The bumpers 84 allow for precise control of preload within stress limits, and this is performed without excessive force. The bumpers 84 can be circumferentially continuous around the fixture 50, or can be located circumferentially around the fixture 50 with small gaps. It is suggested that the gaps be small in order to prevent bridging of the lip skin 20*a*. The placement of the bumpers 84 simulates the positions where the bulkhead 100 and stiffeners 102 (see FIG. 5) will be located in the lip skin 20*a* when formed as a component of the aircraft.

After the lip skin 20*a* is fully engaged with the fixture 50, the force (provided by the sandbag 72, bungee cords 74 attached to external hold-downs 76, or magnet 80) is removed from the 20*a* nose of the lip skin 20*a*.

Thereafter, the lip skin 20*a* is inspected and analyzed relative to the dimensional requirements by the measurement system 70. The use of the fixture and bumpers 84 in this embodiment of the method allows visual access to the external faces of the lip skin 20*a*.

The measurement system 70 can be performed by a variety of devices, such as photogrammetry (ATOS (Advanced Topometric Sensor)) as shown in FIG. 11, CMM (Coordinate Measuring Machine), laser radar, Arm Tracker CMM/Laser System, etc.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A method comprising:
    applying a controlled preload to one or more discrete locations along a contoured surface of a part to constrain the contoured surface to a shape formed in a final assembly, the discrete locations corresponding to points of attachment on the part when assembled with another component to form the final assembly; and
    inspecting said contoured surface to dimensional requirements.

2. The method of claim 1, wherein said controlled preload is applied using magnets.

3. The method of claim 1, wherein said controlled preload is applied using elastic bumpers which engage with said part.

4. The method of claim 1, further comprising:
    mounting said part on a fixture to engage said part with said fixture, wherein the fixture generally conforms in shape to the contoured surface of the part.

5. The method of claim 4, wherein the fixture includes magnets on said fixture at the discrete locations, and wherein the method further comprises:
    after said part is mounted on said fixture, applying magnets to an external face of said part, said magnets interacting with said magnets on said fixture to further engage said part with said fixture to apply said controlled preload.

6. The method of claim 4, wherein the fixture includes elastic bumpers on said fixture at the discrete locations, and
    wherein said part engages with said elastic bumpers when said part is mounted on said fixture to apply said controlled preload.

7. The method of claim 4, further comprising:
    wherein after mounting said part on said fixture, applying a force onto said part to cause said part to move into further engagement with said fixture.

8. The method of claim 7, wherein said force is applied by placing sandbags on said part.

9. The method of claim 7, wherein said force is applied by attaching bungee cords to a fixed structure and over said part.

10. The method of claim 7, wherein said force is applied by magnets positioned at a different location on said fixture than said discrete locations.

11. The method of claim 7, wherein said force is removed prior to inspecting said contoured surface to dimensional requirements.

12. The method of claim 1, wherein said inspecting IS performed using photogrammetry.

13. A method of inspecting a part having a contoured surface, the method comprising:
    engaging the part with a fixture having a shape which generally conforms to the contoured surface of the part;
    applying a controlled preload to one or more discrete locations along the contoured surface to constrain the contoured surface to a shape formed in a final assembly on the fixture, the discrete locations corresponding to points of attachment on the part when assembled with another component to form the final assembly; and
    inspecting the contoured surface to dimensional requirements.

14. The method of claim 13, further including
    positioning magnets on the fixture and corresponding magnets on the part in the discrete locations to apply the controlled preload.

15. The method of claim 13, wherein the controlled preload is applied toward the fixture using magnets.

16. The method of claim 13, wherein the part is an aircraft part.

17. A method of inspecting an aircraft part comprising:
    applying a controlled preload to one or more discrete locations along a flexible contoured surface of the aircraft part to constrain the contoured surface to a fixture in a shape the aircraft part assumes when assembled on the aircraft, the discrete locations corresponding to points of attachment on the aircraft part when assembled on the aircraft; and
    inspecting the contoured surface to dimensional requirements.

18. The method of claim 17, further including positioning magnets on the fixture and corresponding magnets in the discrete locations to apply the controlled preload.

* * * * *